United States Patent
Hui et al.

(10) Patent No.: US 7,502,808 B2
(45) Date of Patent: Mar. 10, 2009

(54) SYNCHRONIZED MULTIMEDIA INTEGRATION LANGUAGE EXTENSIONS

(75) Inventors: Jonathan Hui, Fremont, CA (US); Melanie Nguyen, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 10/777,119

(22) Filed: Feb. 13, 2004

(65) Prior Publication Data

US 2004/0163045 A1  Aug. 19, 2004

Related U.S. Application Data

(63) Continuation of application No. 09/281,983, filed on Mar. 31, 1999, now abandoned.

(51) Int. Cl.
*G06F 17/00* (2006.01)
(52) U.S. Cl. .................. 707/102; 707/101; 715/234
(58) Field of Classification Search ................ 715/513, 715/514–516, 234; 707/102, 101
See application file for complete search history.

(56) References Cited

U.S. PATENT DOCUMENTS 5,860,073 A  1/1999  Ferrel et al. ................ 707/522

OTHER PUBLICATIONS http://www.w3.org/TR/REC-smil/.*
Echiffre, M., Marchisio, C., Marchisio, P., Panicciari, P., and Del Rossi, S. 1998. MHEG-5—Aims, Concepts, and Implementation Issues. IEEE MultiMedia 5, 1 (Jan. 1998), 84-91.*
http:www.w3.org/TR/REC-smil/ as Printed Out in the Year 2007 (this is the correction of a citation of 892 of Feb. 22, 2007).*
"Extensible Markup Language (XML) 1.0", W3C XML Working Group, Feb. 10, 1998, 32 pages.
"Synchronized Multimedia Integration Language (SMIL) 1.0 Specification", W3C Synchronized Multimedia Working Group, Jun. 15, 1998, 39 pages.
"Extensible Markup Language (XML) 1.0", W3C XML Working Group, Feb. 10, 1998, 32 pages.
"Synchronized Multimedia Integration Language (SMIL) 1.0 Specification", W3C Synchronized Multimedia Working Group, Jun. 15, 1998, 39 pages.
www.xmlhack.com/read.php?item=1418, dated Oct. 21, 2001.
developer.apple.com/techpubs/quicktime/qtdevdocs/REF/whatnewqt5/Maz.2d.htm, print date Sep. 30, 2002.
www.w3.org/TR/xml-events, dated Aug. 12, 2002.
research.microsoft.com/~ymwang/papers/HTML/DCOMnCOBRA/S.html, dated Sep. 3, 1997.

* cited by examiner

*Primary Examiner*—David Y Jung
(74) *Attorney, Agent, or Firm*—Fitzpatrick, Cella, Harper & Scinto

(57) ABSTRACT

A set of XML-based markers includes an event marker indicating an event, a condition marker indicating a state of a first media object, and an action marker indicating a second media object, an attribute of the second media object, and a value of the attribute. The markers represent a function to assign the value to the attribute of the second media object if the event is detected and if the first media object possesses the indicated state. A set of XML-based markers representing media object elements. Each marker includes a test-element attribute for indicating a particular media object element, a test-attribute attribute for indicating an attribute of the particular element, and a test-value attribute for indicating a test value to compare with a value of the specified attribute.

26 Claims, 8 Drawing Sheets

```
<par>             /100
    <seq>         /110
        <video src = "V_1.mpg"/>    /130
        <video src = "V_2.mpg"/>    /140
    </seq>    /111
    <seq>     /120
        <par>    /150
            <video src = "V_{31}.mpg"/>    /170
            <video src = "V_{32}.mpg"/>    /180
        </par>    /151
        <par>     /160
            <video src = "V_4.mpg"/>    /190
            <video src = "V_5.mpg"/>    /200
        </seq>    /161
    </seq>    /121
</par>    /101
```

FIG. 1

$t_0 \longrightarrow t_1$ $t_1 \longrightarrow t_2$

SYNCHRONIZED MULTIMEDIA INTEGRATION LANGUAGE EXTENSIONS

This application is a continuation of application Ser. No. 09/281,983, filed Mar. 31, 1999, pending.

BACKGROUND OF THE INVENTION

1. Field of the Invention

The present invention relates to a system for developing and executing a multimedia presentation. More particularly, the present invention concerns an extensible markup language (XML)-based system which allows development and execution of a synchronized multimedia presentation, wherein a sequence of the presentation and/or the behavior of a multimedia object therein is alterable in response to a user event, a system event, a timed event, and/or a detected state of another multimedia object.

2. Description of the Related Art

The hypertext markup language ("HTML") is an XML-based language commonly used to create pages to be displayed by a World Wide Web browser application. More particularly, a developer creates a web page by developing an HTML source file which includes data specifying particular items to be included in the page and spatial relationships among the items. Upon receiving an HTML source file, a web browser parses the file to obtain instructions for formatting and displaying the items of the web page to a user.

Like other high-level programming languages, HTML utilizes fairly intuitive syntax and text-based commands. In addition, a previously-created HTML source file can easily be used as a model for a new source file and resulting web page, or can be edited so as to reformat its resulting web page using simple text-based editing. HTML has proved popular due to its reusability, editability, the simplicity of its required syntax and the functionality provided by its defined commands.

However, traditional HTML can be used only to define spatial, rather than temporal, relationships of objects within a web page. One proposal for providing control over temporal relationships between objects is video streaming, in which frames of a video presentation are sequentially delivered by an Internet server directly to a web browser. However, such a video presentation can be edited only by using sophisticated video-editing equipment, and is not easily-editable using a text-based markup language. Moreover, the video approach requires a very high bandwidth to produce a presentation of reasonable quality.

Another proposed approach requires animated GIF-formatted images to be merged into a single file, which is then downloaded to a web browser for rapid sequential display. Although such animation can be edited by adding, deleting, or substituting images of the animation, editing is significantly more difficult and less flexible than web page editing using a traditional markup language, particularly in the typical case in which a user has access only to the merged file. This approach also requires constant refresh of the web browser display, and therefore unacceptably consumes transmission bandwidth.

In addition to the above shortcomings, the content of a video presentation or an animated GIF presentation cannot be modified during execution of the presentation based on an occurrence of an event. It is possible to display, through a web browser, multimedia presentations which are responsive to events and/or user input by executing a suitable Java-language program using the browser's Java Virtual Machine. Development of these programs, however, requires a significant computer programming background. Therefore, this Java-based approach fails to provide the simplicity and editability of languages such as HTML.

In response to the foregoing, the World Wide Web Consortium (W3C) has circulated a proposed standard, entitled "Synchronized Multimedia Integration Language (SMIL) 1.0 Specification", the contents of which are incorporated herein by reference. SMIL is text-based, XML-based, editable and reusable. In this regard, the W3C standard "Extensible Markup Language (XML) 1.0" is also incorporated herein by reference.

SMIL is intended to provide control over temporal relationships between web page objects. Specifically, SMIL allows a user to define whether multimedia objects of a page are executed in parallel or sequentially, and further provides nested control of parallel/sequential object execution.

For example, the SMIL specification defines the <par> element, which is used to specify elements to be executed in parallel. FIG. 1 shows an illustrative example of a SMIL source file portion utilizing the <par> element. The source file portion shown in FIG. 1 begins with <par> element 100 and ends with corresponding </par> notation 101. It should be noted that the <element> </element> beginning/end syntax is an XML grammar requirement.

According to the SMIL specification, all child elements nested one level below elements 100 and 101 are to be executed in parallel. Therefore, since two child elements <seq> 110 and <seq>120 exist at a first level below <par> element 100, objects corresponding to elements 110 and 120 are each executed in parallel.

In the case of <seq> 110, two media object elements exist between <seq> 110 and end notation 111. In this regard, and also according to the SMIL specification, elements existing as children to a <seq> element are executed sequentially. Therefore, video element 130 is processed, followed by video element 140. It should be noted that statements 130 and 140 each utilize the XML shorthand syntax which allows end notation "/" to be located within an element declaration.

As described above, child elements to <seq> element 120 are executed in parallel with the child elements of <seq> element 110 by virtue of <par> element 100. Therefore, all elements between <seq> element 120 and notation 121 are processed in parallel with elements 130 and 140. In this regard, nested within element 120 and notation 121 are <par> element 150, corresponding notation 151, <seq> element 160 and notation 161. According to <seq> element 120, the video sources indicated by video elements 170 and 180 are first played in parallel, followed by the video sources of video elements 190 and 200, which are played sequentially.

FIG. 2a and FIG. 2b illustrate a portion of a multimedia presentation governed by the SMIL source file shown in FIG. 1. As shown in FIG. 2a, video $V_1$ begins executing at a same time that video $V_{31}$ and video $V_{32}$ begin executing in parallel. In this example, while either one of video $V_{31}$ or video $V_{32}$ continues to play, video $V_1$ finishes and, by virtue of <seq> element 110, video $V_2$ begins to play. At time $t_1$, the one of video $V_{31}$ and video $V_{32}$ having a longer duration than the other terminates.

Next, as shown in FIG. 2b, video $V_2$ continues to play and video $V_4$ begins to play in parallel by virtue of <par> element 100. It should be noted that video $V_4$ begins to play upon termination of the longer of video $V_{31}$ and $V_{32}$ due to <seq> element 120. After termination of video $V_4$, video $V_5$ is played.

FIG. 2c shows a timeline describing the presentation illustrated in FIG. 2a and FIG. 2b. It also should be noted that FIG. 2c represents only one possible timeline resulting from the FIG. 1 SMIL source file, and that the timeline of FIG. 2c depends heavily upon relative durations of the video objects used therein. As described with respect to FIG. 1, FIG. 2a and FIG. 2b, the timeline of FIG. 2c shows that video $V_1$ and video $V_2$ are played sequentially while video $V_{31}$ and video $V_{32}$ are played in parallel. After termination of $V_{32}$, and while video $V_2$ is playing in parallel, video $V_4$ and video $V_5$ are sequentially played.

The SMIL specification provides for presentation control mechanisms in addition to those shown in FIG. 1. For example, attributes can be added to the <par> and <seq> statements to alter their above-described functionality. The SMIL specification also describes several media object elements which can be used in addition to the <video> element of FIG. 1. These elements, which are described in detail in the SMIL specification, include <ref>, <animation>, <audio>, <img>, <video>, <text> and <textstream>. Each of the listed media object elements can also be used with specified attributes which influence their respective functioning.

Notably, the <par>, <seq>, and media object elements are each controllable based on system attributes, such as bit rate and screen size. As described in the SMIL specification, when an attribute specified for an element evaluates to "false", the element carrying this attribute is ignored. For example, if statement 170 of FIG. 1 were replaced by <video src="$v_{31}$.mpg" system-bitrate="56000"/> then, upon encountering line 170, a SMIL-enabled browser would evaluate the approximate bandwidth, in bits-per-second, available to the currently-executing system. In a case that the bandwidth is smaller than 56000, the replaced line 170 would be ignored. As a result, video $V_{31}$ would be absent from the display shown in FIG. 2a.

Other system attributes defined in detail in the SMIL specification include "system-captions", "system-language", "system-overdub-or-caption", "system-required" and "system-screen-depth". Each of these attributes can be included in a <par>, <seq>, or media object statement as described above to change the functioning thereof.

SMIL 1.0 also provides a <switch> element which can be helpful in controlling a multimedia presentation based on the above-described system attributes. The <switch> element allows an author to specify a set of alternative elements from which only one acceptable element should be chosen.

In this regard, upon encountering a <switch> element in a SMIL document, a browser evaluates the children of the <switch> element in the order in which they are listed. The first accepted child is selected to the exclusion of all other children of the <switch> element.

For example, in a case that lines 160, 190, 200 and 161 of FIG. 1 were replaced with

```
<switch>
    <video src="v4.mpg" system-bitrate="56000"/>
    <video src="v5.mpg" system-bitrate="28800"/>
</switch>,
``` the presentation sequence governed by FIG. 1 would depend upon the approximated bandwidth. Specifically, in a case that the bandwidth is greater than or equal to 56000, only video $V_4$ would be played in FIG. 2b upon termination of parallely-executing video $V_{31}$ and video $V_{32}$. On the contrary, if the system bitrate is less than 56000 but greater than 28800, video $v_5$ would be played exclusively in FIG. 2b.

One shortcoming of the above-described elements is that the testable attributes defined by SMIL 1.0 are all system-based attributes, in that they concern characteristics of the computing system upon which the browser is executing, or the system to which the browser is connected. Thus, although the <par> and <seq> synchronization elements and the testable attributes described above are useful in creating a multimedia presentation, these features do not provide control of multimedia presentations based on anything non-system based, such as a user interaction, a timed event, or a state change of an object.

In addition, SMIL 1.0 offers no ability to change an attribute of an object during execution of a multimedia presentation. As such, the functionality and flexibility of SMIL 1.0 is somewhat limited.

Accordingly, what is needed is a system for producing and displaying pages to be transmitted over the World Wide Web which provides control of multimedia objects on a web page based on user events, system events, timed events, or object state, and control over object attributes. Such a system also preferably allows simple and efficient creation and editing of such a web page and the control mechanisms therein.

SUMMARY OF THE INVENTION

The present invention addresses the foregoing by providing XML-based markers representing functions to detect events and to control attributes of media objects in accordance with the detected events.

In one aspect, the present invention is an XML-based event marker which includes an event parameter indicating an event, the marker representing a function to detect the indicated event. According to the further aspects, the event can be a user event such as a mouse click or a system event such as a memory low alert.

The present invention also includes an XML-based action marker which contains an object parameter indicating a media object, an attribute parameter indicating an attribute of the media object, and a value parameter indicating a value of the attribute. Advantageously, the action marker represents a function to assign the value to the attribute of the media object.

In another aspect, an XML-based interpolate marker includes an object parameter indicating a media object, an attribute parameter indicating an attribute of the media object, a begin parameter indicating a first time, an end parameter indicating a second time, and an end value parameter indicating a value of the attribute. The interpolate marker according to the invention represents a function to gradually change a value of the attribute to the end value over a period beginning at the first time and ending at the second time.

In addition, the present invention contemplates an XML-based condition marker containing an Id parameter indicating an element, an attribute parameter indicating an attribute of the element, and a value parameter indicating a value of the attribute, wherein the condition marker represents a function to detect whether or not the attribute of the element possesses the value.

According to the invention, the above-described markers can be utilized together in order to provide sophisticated functionality. For example, in one embodiment, the invention is a set of XML-based markers including an event marker indicating an event, and an action marker indicating a media object, an attribute of the media object, and a value of the attribute, wherein the set of markers represents a function to assign the value to the attribute if the event is detected.

In another embodiment, the present invention is a set of XML-based markers including an event marker indicating an event, a condition marker indicating a state of a first media object, and an action marker indicating a second media object, an attribute of the second media object, and a value of the attribute. This set of markers represents a function to assign the value to the attribute of the second media object if the event is detected and if the first media object possesses the indicated state.

In an additional embodiment, the invention is a set of XML-based markers including an event marker indicating an event, and an interpolate marker indicating a media object, an attribute of the media object, a first time, a second time, and a value of the attribute, wherein the markers represent a function to gradually change a value of the attribute to the end value over a period beginning at the first time and ending at the second time if the event is detected.

In yet another embodiment, the invention is a set of XML-based markers which include an event marker indicating an event, a condition marker indicating a state of a first media object, and an interpolate marker indicating a second media object, an attribute of the second media object, a first time, a second time, and a value of the attribute. According to this embodiment, the markers represent a function to gradually change a value of the attribute to the end value over a period beginning at the first time and ending at the second time if the event is detected and if the first media object possesses the indicated state.

In another aspect, the present invention relates to a set of XML-based markers representing media object elements, each marker including a test-element attribute for indicating a particular media object element, a test-attribute attribute for indicating an attribute of the particular element, and a test-value attribute for indicating a test value to be compared with a value of the specified attribute.

Because of the extension of test attributes from mere system-based attributes according to the prior art, the invention is able to provide selection between alternative different multimedia presentations based on non-system-based characteristics, such as user interaction or the characteristics and content of other multimedia objects.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 1 shows a portion of document source code according to the SMIL 1.0 specification.

DETAILED DESCRIPTION OF THE PREFERRED EMBODIMENT

Figure 2A:
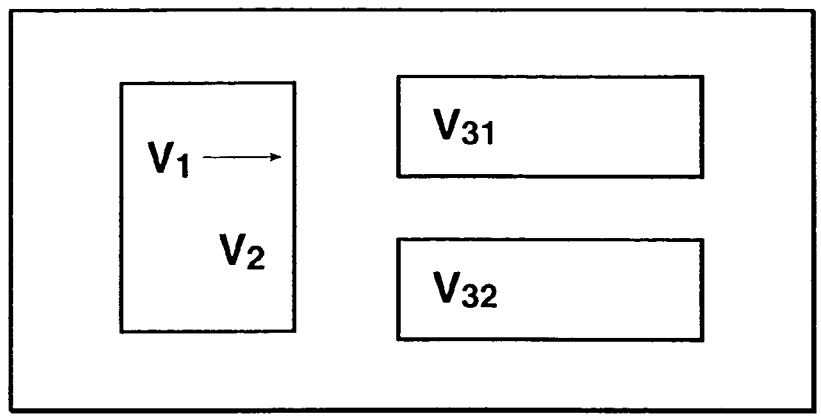
FIG. 2a shows a display of a web browser executing a first part of the FIG. 1 source code.
Figure 2B:
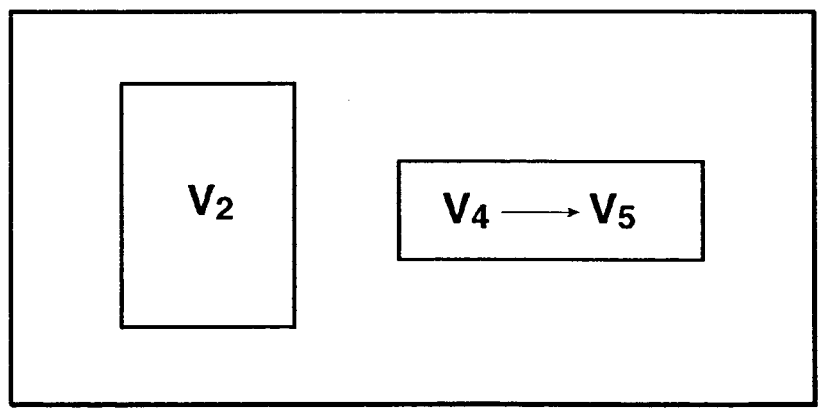
FIG. 2b shows a display of a web browser executing a second part of the FIG. 1 source code.
Figure 2C:
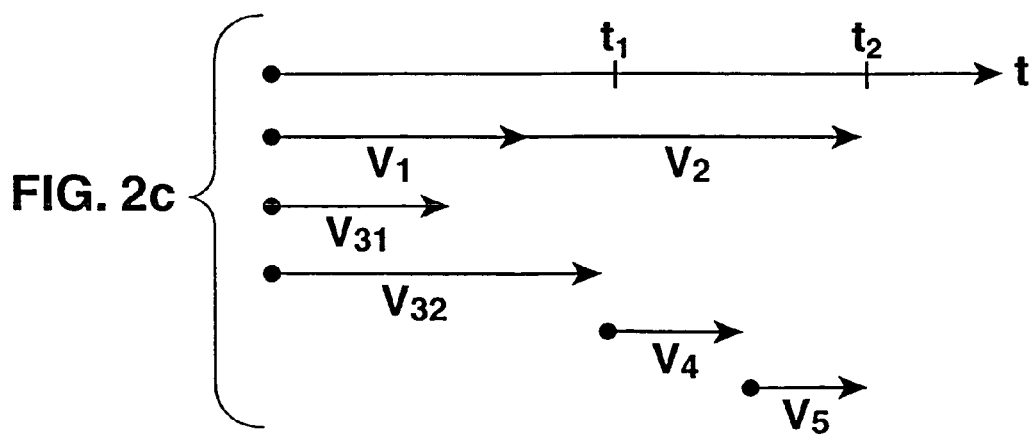
FIG. 2c is a timeline showing temporal relationships of multimedia objects executing according to the FIG. 1 source code.
Figure 3:
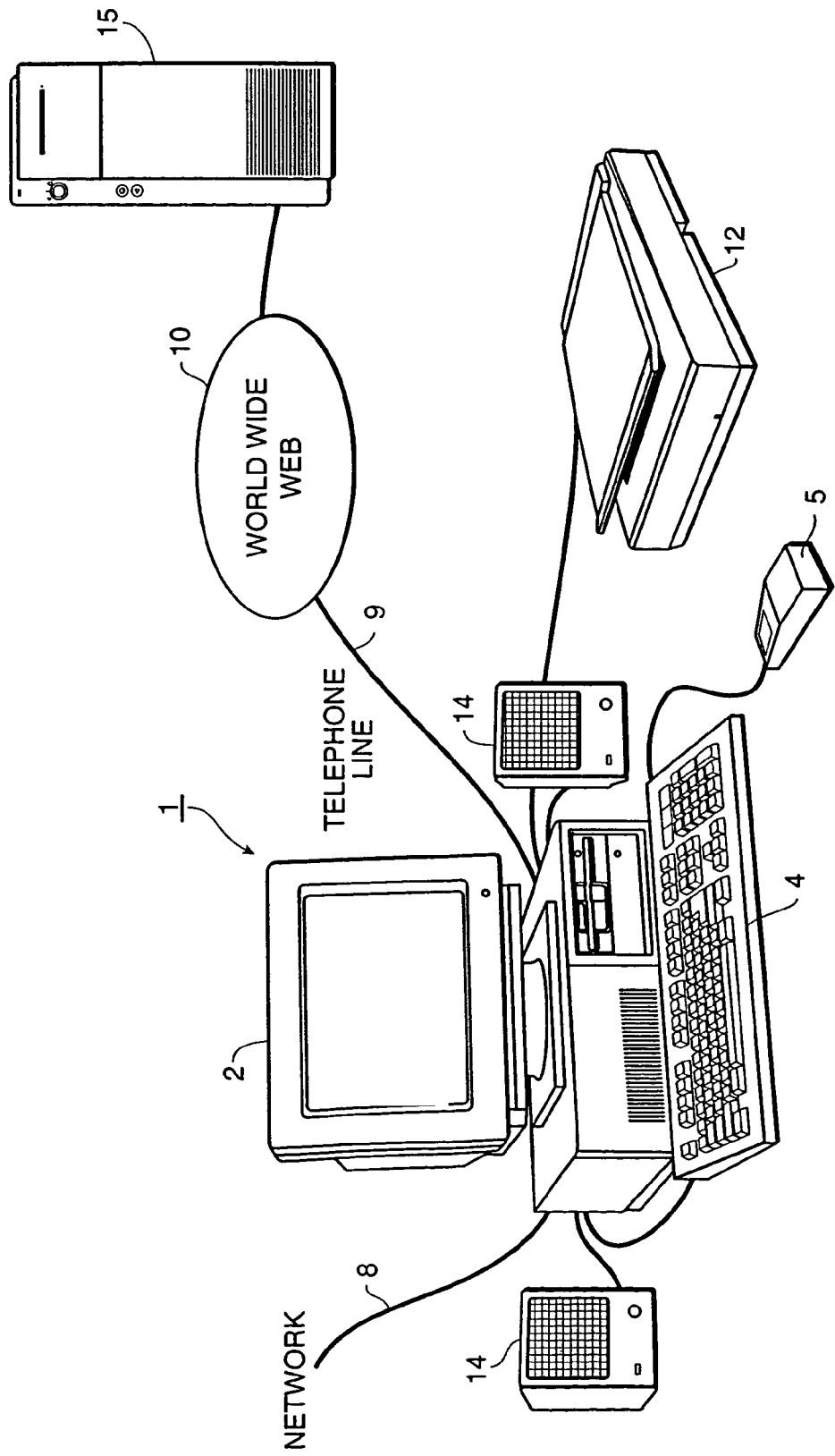
FIG. 3 is an outward view of a computing environment utilizing the present invention.

FIG. 3 is an outward view of a representative computing system utilizing the present invention.

Computing equipment 1 is preferably an Intel® Pentium®-based computer executing a windowing operating system such as Microsoft Windows98®. Computing equipment 1 includes display 2 for displaying images to a user and fixed disk 3 which stores computer-executable process steps of the windowing operating system and of other applications executed by computing equipment 1, such as a World Wide Web browser application. Fixed disk 3 also stores data files and device drivers for use by computing equipment 1. Also provided with computing equipment 1 are keyboard 4 for entering text and commands into appropriate fields displayed on display 2, and pointing device 5, such as a mouse, for pointing to, selecting and manipulating objects displayed on display 2.

Floppy disk drive 6 provides an interface to computing equipment 1 for reading data from and writing data to a floppy disk inserted therein. Using floppy disk drive 6, the above-described computer-executable process steps and/or data files may be input to computing equipment 1 and stored on fixed disk 3. Computer-executable process steps and data files may also be retrieved over a network via network connection 8 or via telephone line 9 from World Wide Web 10. In addition, image data files can be retrieved from scanner 12 and stored on fixed disk 3.

Multimedia speakers 14 provide sound output based on audio data files executed by computing equipment 1. Such an audio file may be in a monaural or stereo format, or in any other type of audio format, so long as computing equipment 1 is provided with a corresponding audio decoder and player application.

Computer-executable process steps and data files obtained by computing equipment 1 over World Wide Web 10 are transferred thereto by servers such as server 15. In response to a request for data, server 15 collects the required data, properly formats the data, and sends the data to computing equipment 1 over World Wide Web 10.

Figure 4:
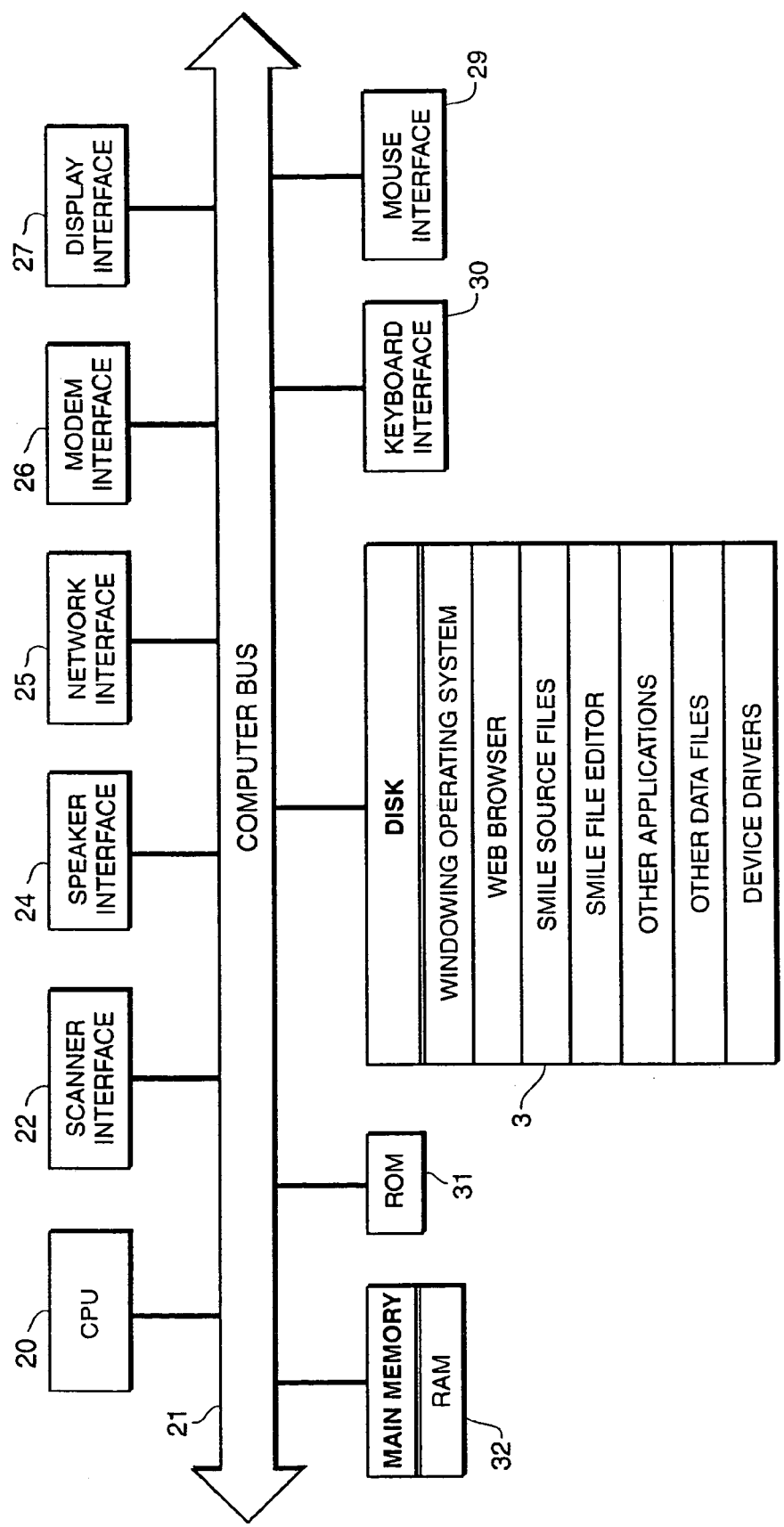
FIG. 4 is a block diagram illustrating the internal architecture of a computer utilizing the present invention.

FIG. 4 is a block diagram of the internal architecture of computing equipment 1. Shown in FIG. 4 is CPU 20, which, as described above, is preferably a Pentium® processor. CPU 20 interfaces to computer bus 21, as does scanner interface 22 for interfacing to scanner 12, speaker interface 24 for interfacing to speakers 14, network interface 25 for interfacing to network connection 8, modem interface 26 for interfacing to telephone line 9 and display interface for interfacing to display 2. Mouse interface 29, which interfaces to mouse 5, and keyboard interface 30, which interfaces to keyboard 4, are also connected to bus 21. In this regard, interfaces 22 to 30 allow computing equipment 1 to access the functionality of their corresponding components. Also shown in FIG. 4 is disk 3, having stored thereon the aforementioned windowing operating system, a web browser, XML-based source files according to the present invention, which, for convenience sake, are hereinafter referred to as Synchronized Multimedia Integration Language Extended (SMILE) source files, a SMILE file editor application, other applications, other data files and device drivers.

The web browser stored on fixed disk 3 is preferably capable of interpreting elements and attributes of a SMILE source file and executing a corresponding multimedia presentation in accordance with functionality dictated by the elements and attributes. For example, Netscape Navigator and Internet Explorer are common HTML-enabled browsers, and a SMIL enabled browser is currently available from Realnetworks.

Read only memory (ROM) 31 stores invariant computer-executable process steps for basic system functions such as basic I/O, start-up, or reception of key strokes from keyboard 4.

Main random access memory (RAM) 32 provides CPU 20 with memory storage which can be accessed quickly. In this regard, computer-executable process steps of a web browser or other application are transferred from disk 3 over computer bus 21 to RAM 32 and executed therefrom by CPU 20.

Figure 5:
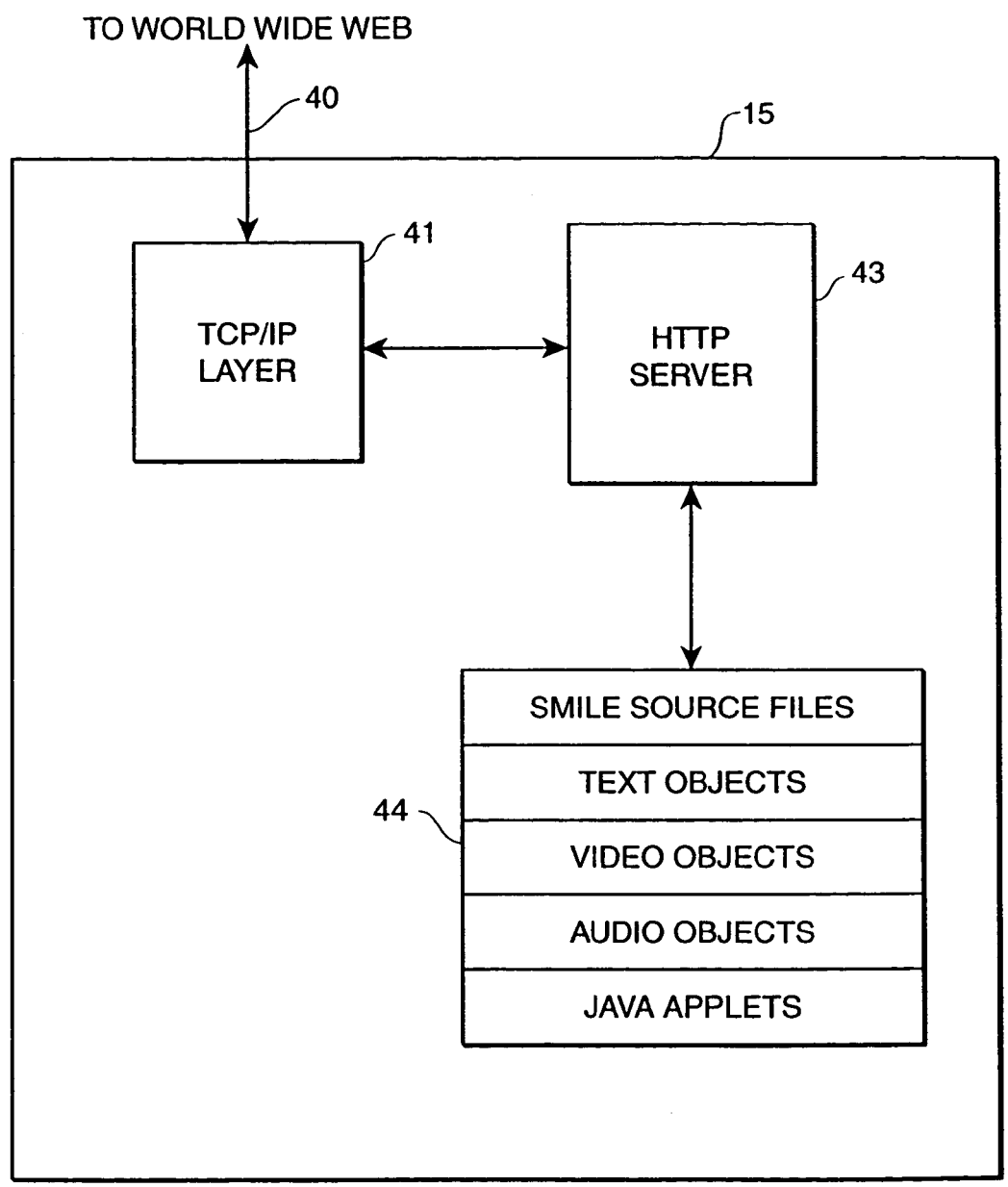
FIG. 5 is a block diagram illustrating the internal architecture of a web server utilizing the present invention.

FIG. 5 is a block diagram of several relevant components internal to server 15. As shown, server 15 is connected to World Wide Web 10 via World Wide Web connection 40, which may be a telephone line, a T1 line, a local area network connection, or the like. In a case that World Wide Web connection 40 connects directly to a local area network, the local area network is preferably connected to a router which, in turn, is connected to World Wide Web 10. In such a configuration, the router includes firewall software for prevention of unauthorized access to the local area network.

Data packets received over World Wide Web 10 (IP packets) travel over connection 40 to TCP/IP layer 41. TCP/IP layer 41 re-orders the IP packets and parses data therefrom. The parsed data is delivered to HTTP (hypertext transfer protocol) server 43. Based on the parsed data, HTTP server 43 retrieves appropriate files from file storage 44 and transfers the files to TCP/IP layer 41. The files are then formatted into IP packets and sent over World Wide Web connection 40 to computing equipment 1.

According to the present invention, file storage 44 stores at least source files in a SMILE format according to the present invention, as well as text, video and audio objects which are referenced by stored SMILE source files. File storage 44 may also store Java applets which can be executed by a Java virtual machine of a web browser executing in computing equipment 1.

It should be noted that other servers and protocol layers may be used by server 15. In this regard, although HTTP server 43 and TCP/IP layer 41 are useful for transmitting text and fixed images over a firewall, a specialized streaming server utilizing the TCP or UDP protocol may be preferred for sending streaming audio or video data over World Wide Web 10.

I. Test Attributes

As mentioned in the Background of the Invention, the SMIL specification allows conditional execution of elements based only on system attributes, such as bit rate or screen size. According to one aspect of the present invention, test attributes, which can be any attributes of an object or element, can be defined for use in any of the <par>, <seq>, or media object elements. As a result, presentation flow can be controlled based on non-system-based attributes.

More specifically, the present invention defines three new attributes for the <par>, <seq> and media object elements, "test-element", test-attribute", and "test-value". The "test-element" attribute can be assigned an Id of a particular element to indicate that an attribute of the particular element is to be tested. In this regard, the "test-attribute" attribute specifies the attribute of the particular element to be tested. Finally, the "test-value" attribute indicates the value with which the value of the specified attribute is to be compared.

For example, the source code:

```
<audio id="Audio" src="Audio.wav" test-
    element="Video" test-attribute="sound" test-
    value="on"/>
<textstream id="Text" src="text.txt" test-
    element="Video" test-attribute="sound" test-
    value="off"/>
``` causes a sound file "Audio.wav" to be played in a case that a "sound" attribute of a video object having the Id "Video" has the value "on", and causes a text file "text.txt" to be displayed in a case that the "sound" attribute of the video object has the value "off".

For media object elements, the present invention also defines a "status" attribute, a "sync" attribute, and a "start-asap", attribute. The "status" attribute indicates whether an element is activated or deactivated and can be assigned the values "activate" (the default value) or "deactivate".

The "sync" attribute is used to indicate a group of elements with which execution of an object should be strictly synchronized. In addition, the "start-asap" attribute indicates that object execution should begin as soon as possible.

II. The <Action> Element

A SMILE source file according to the present invention may include an <action> element for changing a value of an attribute of another element. The <action> element can therefore be used for inter-object communication or for changing the behavior of objects in a presentation in real-time. According to the present invention, the <action> element can include the "id" and "skip-content" attributes defined in the SMIL specification. Moreover, the <action> element can include the attributes "dest", "order-number", "attribute", "value", and "begin".

The "dest" attribute refers to a particular element upon which the <action> element is intended to operate. In this case, an Id for the particular element can be defined using the SMIL "id" attribute and the Id can then be referred to using the "dest" attribute of the <action> element. For example, based on the source code <video Id="myVideo" src="video.mpg"/>, an <action> element statement for operating on the video element would contain the attribute definition dest="myVideo".

The "order number" attribute assigns an order number to an <action> element so as to indicate a time at which the particular <action> element is to be executed relative to other <action> elements. Such an attribute is useful if, as described above with respect to FIG. 1, an object-execution sequence of a source file is dependent upon relative durations of the objects referenced therein.

The "attribute" element identifies an attribute of the particular element indicated by the "dest" attribute. In this regard, the "value" attribute indicates a value to which the identified attribute is to be altered. Accordingly, any defined attribute of any defined element can be altered simply by referencing the element and the attribute using the "dest" and "attribute" attributes, respectively. Finally, the "begin" attribute indicates a time delay from a time at which the <action> element is encountered by the web browser to actual execution of a specified value change.

The following is a representative example of code utilizing the above-described <action> element.

```
<par>
    <audio src="Audio₁.wav" volume="10" Id="audio₁"/>
    <seq>
    <video src="Video₁.mpg"/>
    <action dest="Audio₁" attribute="volume"
    value="20"/>
    <seq>
</par>
```

As explained above, all child elements at a first level below the <par> element are to be executed in parallel. Therefore, in the present case, the above <audio> element and the elements encompassed by the <seq> element are performed in parallel.

As shown, the <audio> element according to the present invention can include a "volume" attribute, the value of which corresponds to a volume at which the referenced audio object is played through speakers 14. By virtue of the above source code, the audio file Audio₁.wav is played at a volume 10.

Figure 6A:
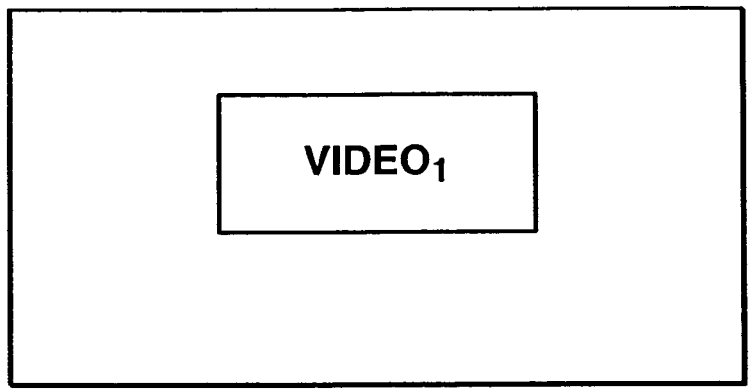
FIGS. 6a and 6b illustrate sequences of a multimedia presentation according to the present invention.

FIG. 6a shows a display of a browser executing the above source code. At time 0, both audio file Audio₁.wav and video file Video₁.mpg are executed. It should be noted that Video₁.mpg is executed since it is a first element in a sequence which is to be performed in parallel with the Audio₁.wav file.

For the purpose of the present example, it is assumed that Video₁.mpg has a duration of 5 seconds. Accordingly, after 5 seconds has elapsed, the above-listed <action> statement is executed. In this regard, the <action> statement includes a "dest" attribute and an "attribute" attribute, which identify, respectively, the listed <audio> element and the "volume" attribute of the <audio> element. The <action> element also includes a "value" attribute, which, as described above, refers to a value to which the attribute referenced by the <action> element is to be changed.

Figure 6B:
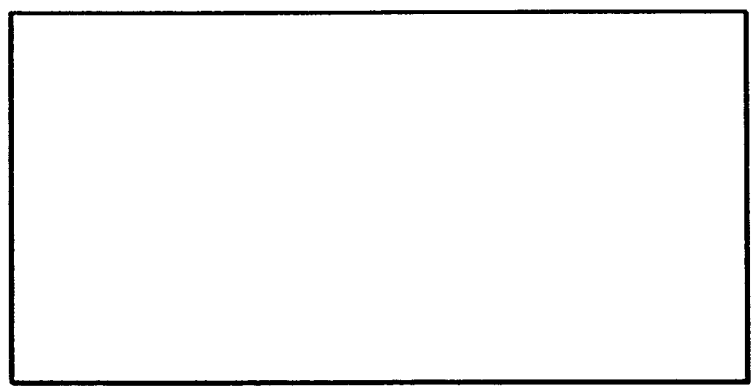

In the present example, the "volume" attribute of the <audio> element should be changed to 20. Accordingly, FIG. 6b shows a representation of a multimedia presentation dictated by the above source code after 5 seconds have elapsed. As shown, Video₁.mpg has ceased to play and file Audio₁.wav is played at a volume corresponding to a "volume" attribute value of 20.

The functionality provided by the above-described <action> element is not provided by the SMIL specification. The <action> element advantageously provides control over object attributes before, during and after object execution, thereby greatly increasing the presentation options available to a presentation developer. A further advantage of the <action> element is that the <action> element is easy to understand, use and edit, thereby preserving the user friendliness of XML-based languages.

III. The <Interpolate> Element

According to the present invention, an <interpolate> element is provided for changing a value of an element attribute. In this respect, it will be noted that the <interpolate> element is similar to the <action> element. However, as described in detail below, the <interpolate> element provides greater control than the <action> element over the manner in which an attribute value is changed over time.

The <interpolate> element includes a "id" attribute and a "skip-content" attribute as defined by the SMIL specification. The <interpolate> element also includes a "dest" attribute which identifies an element, an attribute of which will be changed according to the <interpolate> element. In this regard, the <interpolate> element also includes an "attribute" attribute, which specifies the attribute of the referenced element which is to be changed.

The <interpolate> element further includes a "begin" attribute which specifies an elapsed time, from a time when the <interpolate> element is encountered by a web browser, after which the specified attribute should begin changing. Relatedly, an "end" attribute is also provided which specifies an elapsed time, from a time when the <interpolate> element is encountered, at which the attribute should cease changing. In addition, the <interpolate> element includes an "end-value" attribute, which indicates a value to which the referenced attribute should be changed.

Figure 7A:
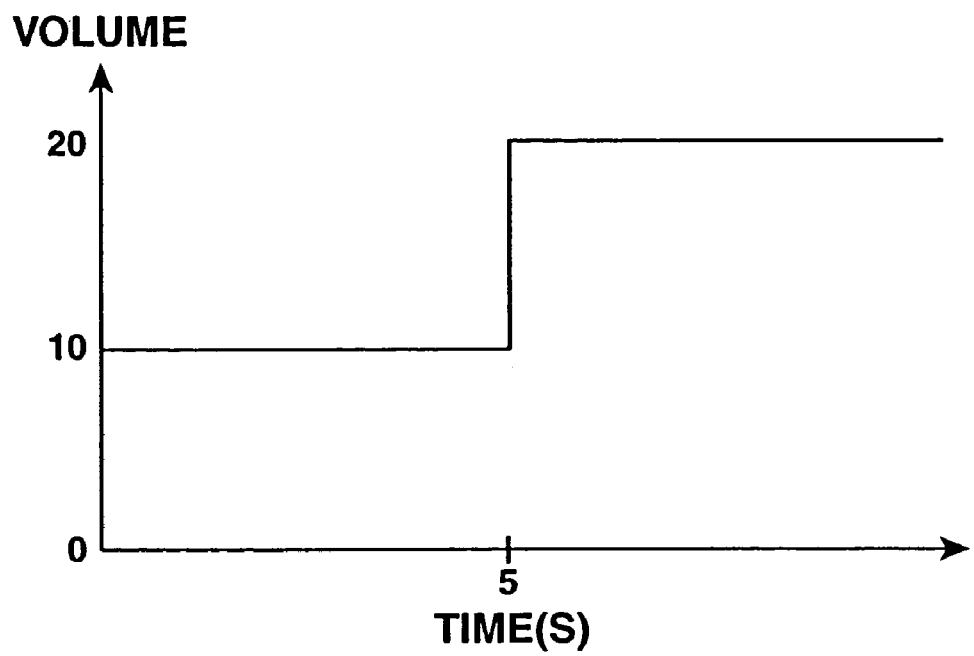
FIG. 7a is a graph illustrating a volume change of an audio object according to the present invention.

FIG. 7a is a graph of volume versus time for the presentation shown in FIG. 6a and FIG. 6b. As shown, and as described above, the volume of audio file Audio₁.wav is set to 10 for the first 5 seconds of the presentation, after which time the volume attribute is set to 20 by virtue of the described <action> element.

Figure 7B:
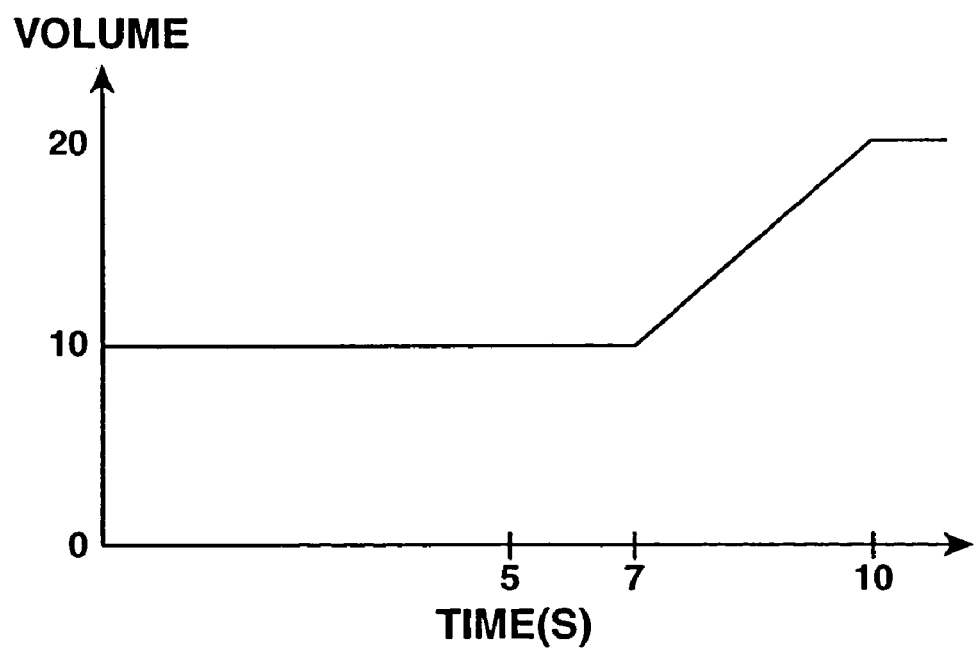
FIG. 7b is a graph of illustrating a volume change of an audio object according to the present invention.

FIG. 7b shows a corresponding graph in a case that the <action> element statement is substituted with the statement:

```
<interpolate dest="Audio₁" attribute="volume"
    end-value="20" begin="2s" end="5s"/>.
```

As described above, the attributes of the foregoing <interpolate> element indicate that the volume attribute of the element having the Id "Audio₁" should begin changing 2 seconds after encountering the <interpolate> element. Moreover, the attributes indicate that the changing should continue for 3 seconds (5 seconds-2 seconds) and the volume should be 20 at the end of the changing.

Continuing with the assumption that the Video₁.mpg has a duration of 5 seconds, FIG. 7b shows that Audio₁.wav is played at a volume of 10 for the first 5 seconds of the presentation, after which point the <interpolate> element is encountered. Based on the "begin" attribute, the "volume" attribute begins changing 2 seconds after the <interpolate> element is encountered, or 7 seconds into the presentation. The changing continues until 5 seconds after the <interpolate> element was encountered, or 10 seconds into the presentation. As shown by FIG. 7b, the result of the <interpolate> element is a gradual transition from the initial attribute value to the final attribute value.

Accordingly, the <interpolate> element offers new functionality similar to that offered by the <action> element, and also allows for gradual change of element attribute values.

Conventionally, controls of an object utilized in a HTML or a SMIL presentation are not exposed in corresponding HTML or SMIL source code. Rather, according to those languages, an object is merely downloaded from a web location indicated in the source code. As such, object controls cannot be manipulated through editing of the source file. Therefore, the <action> and <interpolate> elements of the present invention advantageously offer simple control over presentation objects not offered by the above conventional systems.

IV. The <Event> Element

According to another aspect, the present invention includes a <event> element which captures user events or system events. Upon capture of a specified event, child elements to the <event> element are processed.

The <event> element includes the "id" and "skip-content" attributes defined in the SMIL specification. Also included are a "source-event" attribute, which defines the type of event to be captured, and a "coord" attribute for specifying a coordinate position on a browser display. The "source-event" attribute can have the following values: "leftmouseclick", "rightmouseclick", "mouseover", "mousein", "mouseout", "mousedown", and "timerevent". If no value for the "source-event" attribute is specified in an <event> element, the element defaults to a TRUE value.

The "source-event" attribute value "leftmouseclick" refers to a press-and-release of the left button of mouse 5. Several distinct types of situations can be detected by setting the "source-event" attribute to "leftmouseclick". First, in a case that the <event> element is not a child element to a media object and the "source-event" attribute is assigned a value of "leftmouseclick", any press and release of the left mouse button is detected upon encountering the <event> element. On the other hand, if particular coordinates are specified using the "coord" attribute, only those press-and-releases of the left mouse button which occur while a displayed mouse pointer is within the specified coordinates are captured.

Moreover, in a case that an <event> element is a child element to an element such as, for example, a video element specifying a video object, only those press-and-releases of the left mouse button which occur while the pointer is on the executing video object are captured. However, if coordinates are also specified using the "coord" attribute, then only those press-and-releases occurring while the pointer is within the specified coordinates are captured.

The "rightmouseclick" attribute value functions as described above with respect to the "leftmouseclick" value, but instead with respect to the right button of mouse 5. In addition, the "mousedown" value of the "source-event" attribute operates similarly to the "leftmouseclick" and "rightmouseclick" values, however, the "mousedown" value describes and is used to detect a situation in which a mouse button is merely pressed but not necessarily released in an appropriate area.

The "mouseover" value operates similarly to the "leftmouseclick" and "rightmouseclick" values described above, however, a "mouseover" source event does not require any movement of a mouse button. Rather, if a "mouseover" attribute value is specified with an <event> element, then an event is captured in a case that the pointer is in a region of the browser display specified by a parent element of the <event> element or by values of a "coordinate" attribute of the <event> element. Using the previous example, in a case that such an <event> element is a child element to a <video> element, the event is captured in a case that a pointer is moved to any area of the executing video. In a case that the <event> element is not a child of a media object and does not include a "coordinate" attribute, the region of detection is the entire browser display.

A "mousein" or "mouseout" source event is captured in a case that a mouse pointer is moved into a region of a parent media object element or out of the region of the parent media object element, respectively. If used in conjunction with a "coordinate" attribute, a "mousein" or "mouseout" source event is captured in a case that a mouse pointer is moved into a region defined by a specified value of the "coordinate" attribute. Similarly to the "mouseover" value, the region of interest is the entire browser display for an <event> element specifying a "mousein" or "mouseout" source event value which is not a child of a media object and does not include a "coordinate" attribute.

The "timerevent" value of the "source-event" attribute is preferably not used with a specified "coord" attribute value. This attribute value is used in <event> elements which are child elements to a media object element. The "timerevent" value is used to detect an interrupt included with the parent media object.

The foregoing is an example of a portion of a source code file according to the present invention which utilizes the above-described <event> and <action> elements:

```
<par>
    <video src="Video2.avi" Id="Video2"
    status="deactivate"/>
    <Img src="Image1.gif">
        <event source-event="leftmouseclick"/>
            <action dest="Video2"
            attribute="status"
            value="activate"/>
        </event>
    </img>
</par>
```

Figure 8A:
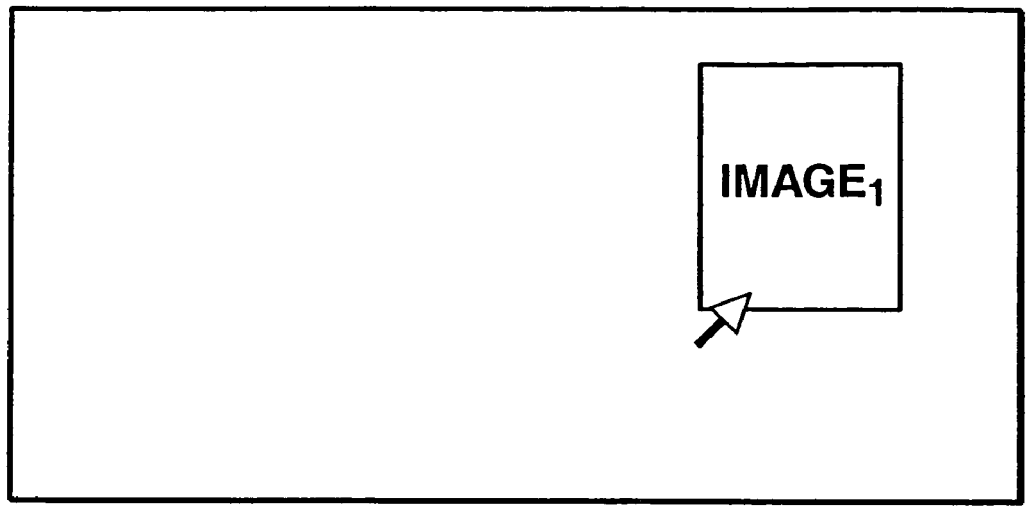
FIG. 8a and FIG. 8b are views illustrating event detection and object state change during a multimedia presentation according to the present invention.

The <video> element of the above source code is assigned an Id "Video$_2$," and a source "Video$_2$.avi". Moreover, the <video> element is assigned a "deactivate" value to its "status" attribute. Accordingly, upon encountering the <video> element, a web browser executing the source file does not play the referenced video file "Video$_2$.avi ". The next statement in the source code is an <img> element having a source file "Image$_1$.gif". Accordingly, as shown in FIG. 8*a*, the referenced image "Image$_1$.gif" is displayed by the web browser.

An <event> element is defined as a child element to the above-described <img> element. Accordingly, the <event> element is evaluated during display of the referenced image. As shown above, the assigned value of the "source-event" attribute is "leftmouseclick". Based on the above discussion, a "leftmouseclick" event is deemed to be captured upon detection of a press and release of the left mouse button of mouse 5 while a mouse pointer is within the display area of Image$_1$, as shown in FIG. 8*a*. As also described above, in a case that a "coord" attribute is also defined in the <image> element, the pointer must be located within the specified coordinates for the event to be deemed captured.

Figure 8B:
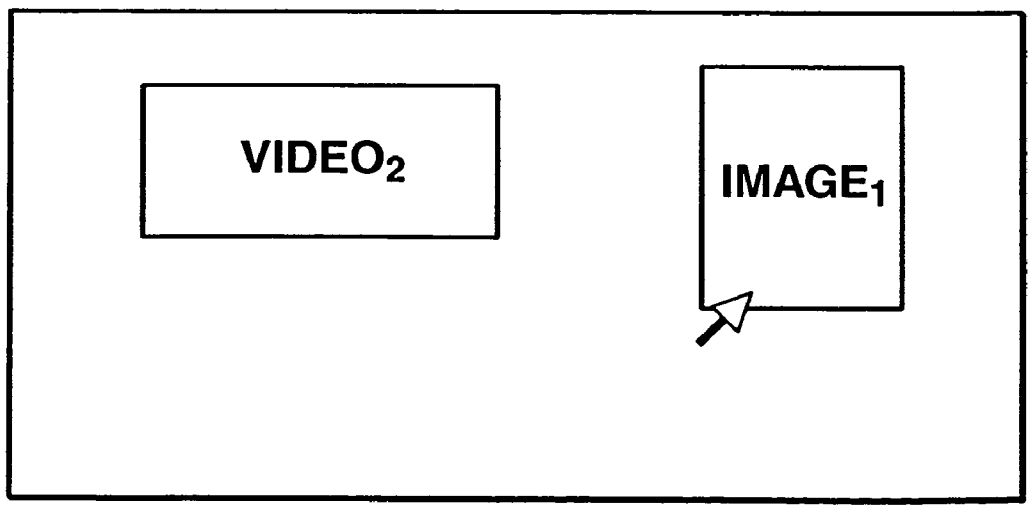

Upon capture of the specified event, the listed <action> element is processed. As shown, the <action> element contains attributes which indicate that the "status" attribute of the <video> element indicated by the Id "Video$_2$" is to be changed to "activate". Accordingly, and as shown in FIG. 8*b*, "Video$_2$.avi" begins to play.

V. The <Condition> Element

The <condition> element can be used to test for the existence of a particular situation so as to allow selective performance of an action based on whether or not the situation exists.

The <condition> element includes an "id" and a "skip-content" attribute as defined by the SMIL specification. The <condition> element also includes a "dest" attribute, which refers to an Id of a particular element to be tested, an "attribute" attribute, which refers to a particular attribute of the particular element to be test, and a "value" attribute, which refers to a value to be compared with the value of the particular attribute to be tested. In operation, if the value indicated by the "value" attribute of the <condition> element is equal to the value of the referenced attribute, the condition is deemed true and a next line of source code is executed.

The following portion of source code is identical to that described above with respect to FIG. 8a and FIG. 8b, with the addition of a <condition> statement:

```
<par>
    <video src="Video₂.avi" Id="Video₂"
    status=deactivate/>
    <img src="image₁.gif">
        <event source-event="leftmouseclick"/>
            <condition dest="Video₂.avi"
            attribute="status" value="activate"/>
            <action dest="Video₂"
            attribute="status"
            value="activate"/>
        </event>
    </img>
</par>
```

In the above example, the <condition> statement is evaluated after a "leftmouseclick" is detected within the display area of image₁. In this regard, the <condition> statement evaluates whether the "status" attribute of the element indicated by the "Video₂" Id has the value "activate". If not, the subsequent <action> statement is not processed, even though the <action> statement is not nested within the <condition> statement. Conversely, if the <condition> statement is evaluated as true, the <action> statement is processed.

According to the invention, the <event>, <condition> and <action> elements can also be used together so as to change an attribute of an object based on a state change of an object. For example, in a case that the <event . . . > element of the previous example was replaced with "<event>", a browser encountering the replaced line would immediately evaluate the following <condition> element and execute or not execute the following <action> element based thereon.

VI. The <and-Condition> and <or-Condition> Elements

The <and-condition> element allows several conditions to be logically AND'd together. Specifically, the <and-condition> element can be used as follows to logically AND two conditions A and B:

```
<and-condition>
    <condition id="A" . . . />
    <condition id="B" . . . />
</and-condition>
```

The <and-condition> element returns a TRUE value in a case that all <condition> elements nested therein evaluate to TRUE. The <or-condition> element follows a similar syntax as that described above with respect to the <and-condition> element, however, the <or-condition> element logically ORs any <condition> elements nested therein.

The <and-condition> and <or-condition> elements can be nested. In this regard, the following portion of source code performs the function ((C or D) and (E and (F or G))):

```
<and-condition>
    <or-condition>
        <condition id="C" . . . />
        <condition id="D" . . . />
    </or-condition>
    <and-condition>
        <condition id="E" . . . />
        <or-condition>
            <condition id="F" . . . />
            <condition id="G" . . . />
        </or-condition>
    </and-condition>
</and-condition>
```

Both the <and-condition> and the <or-condition> elements contain the attributes "id" and "skip-content" as defined by the SMIL specification. Also, as described above, both elements can contain <and-condition>, <or-condition> and <condition> child elements.

In a case that either an <and-condition> or an <or-condition> element are evaluated as true, a subsequent <action> statement is processed, as described above with respect to <condition> element.

VII. The <Switch> Element

As described above, the <switch> element as presently defined by the SMIL 1.0 specification does not provide for switching between child elements based on attributes other than system-based attributes. According to the present invention, however, the <switch> element includes test attributes which allow testing of attributes of other elements defined in a source code file.

The <switch> element according to the present invention includes a "id" and a "title" attribute, as defined by the SMIL 1.0 specification. The <switch> element also includes a "selection" attribute, which can be changed during source file execution using the elements described herein. The following source code is an example of such a use.

```
<image src="selection.gif">
    <event source-event="leftmouseclick" coord="0%,
    0%, 50%, 100%">
        <action dest="mySwitch"
        attribute="selection" value= "1"/>
    </event>
    <event source-event="leftmouseclick" coord="0%,
    50%, 100%, 100%">
        <action dest="mySwitch"
        attribute="selection" value="2"/>
    </event>
</image>
<switch id="mySwitch">
    <video src="myVideo1.mpg" test-
    element="mySwitch" test-attribute="selection"
    test-value="1"/>
    <video src="myVideo2.mpg" test-
    element="mySwitch" test-attribute="selection"
    test-value="2"/>
</switch>
```

According to the above code, a detection of a left mouse click at one portion of a browser display causes a value of the "selection" attribute of a <switch> element having the Id "mySwitch" to change to (or remain at) "1". If the event is detected at another part of the display, the value changes to (or remains at) "2".

Next, a first TRUE conditional statement nested in the <switch> element is processed, and the other is ignored. As shown, both statements nested in the <switch> statement are conditional media object statements by virtue of the attributes "test-element", "test-attribute" and "test-value" explained above. Accordingly, myVideo1.mpg is played in a case that the "selection" attribute of the <switch> element has a value of "1", while myVideo2.mpg is played if the attribute has a value of "2".

The foregoing example illustrates several advantages of the present invention. Among others, one advantage lies in the ability provided by the invention to use <par>, <seq> and media object element statements which are conditionally executed based on an evaluation of non-system attribute values.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. In an extensible markup language document stored on a computer-readable memory medium, wherein said document comprises plural elements including a media object element used in developing and executing a multimedia presentation by a computer, an action element tag which is readable by the computer from the memory medium and which defines an action, comprising:
    an object parameter indicating a media object element identified elsewhere in said document;
    an attribute parameter indicating an attribute of the indicated media object element; and
    a value parameter indicating a value of the attribute,
    wherein the action element tag represents a function to change a value of the attribute indicated by the attribute parameter of the media object element indicated by the object parameter to the value indicated by the value parameter.

2. An action element tag according to claim 1, further comprising a begin parameter indicating a time delay to wait prior to changing the value of the attribute of the media object.

3. An action element tag according to claim 1, further comprising an order-number parameter indicating a position in a sequence of actions at which the value of the attribute of the media object is to be changed.

4. In an extensible markup language document stored on a computer-readable memory medium, wherein said document comprises plural elements including a media object element used in developing and executing a multimedia presentation by a computer, an interpolation element tag which is readable by the computer from the memory medium and which defines an interpolation, comprising:
    an object parameter indicating a media object element identified elsewhere in said document;
    an attribute parameter indicating an attribute of the indicated media object element;
    a begin parameter indicating a first time;
    an end parameter indicating a second time; and
    an end value parameter indicating an end value of the attribute,
    wherein the interpolation element tag represents a function to gradually change a value of the attribute indicated by the attribute parameter to the end value indicated by the end value parameter over a period beginning at the first time indicated by the begin parameter and ending at the second time indicated by the end parameter.

5. In an extensible markup language document stored on a computer-readable memory medium, wherein said document comprises plural elements used in developing and executing a multimedia presentation by a computer, a condition element tag which is readable by the computer from the memory medium and which defines a condition, comprising:
    an element Id parameter indicating an element identified elsewhere in said document;
    an attribute parameter indicating an attribute of the indicated element; and
    a value parameter indicating a value of the attribute,
    wherein the condition element tag represents a function to detect whether or not the attribute indicated by the attribute parameter of the element indicated by the element Id parameter possesses the value indicated by the value parameter.

6. In an extensible markup language document stored on a computer-readable memory medium, wherein said document comprises plural elements including a media object element used in developing and executing a multimedia presentation by a computer, a pair of element tags which are readable by the computer from the memory medium and which define an event and an action, comprising:
    an event element tag indicating a type of event to be captured by the computer; and
    an action element tag indicating the media object element, an attribute of the media object element, and a value of the attribute,
    wherein said action element tag is a child to said event element tag; and
    wherein the event and action element tags represent a function to change a value of the attribute of the media object element indicated by the action element tag to the value indicated by the action element tag if the event of the type indicated by the event element tag is detected.

7. A set of element tags according to claim 6, wherein the event element tag indicates a user event.

8. A set of element tags according to claim 6, wherein the event element tag indicates a system event.

9. A set of element tags according to claim 6, the action element tag indicating a time delay to wait, after detection of the event, before changing the value of the attribute of the media object.

10. A set of element tags according to claim 6, the action element tag indicating a position in a sequence of actions at which the value of the attribute of the media object is to be changed.

11. A set of element tags according to claim 6, further comprising a second action element tag indicating a second media object, an attribute of the second media object, and a second value of the attribute,
    wherein the element tags represent a function to assign the second value to the attribute of the second media object if the event is detected.

12. In an extensible markup language document stored on a computer-readable memory medium, wherein said document comprises plural elements including first and second media object elements used in developing and executing a multimedia presentation by a computer, a triplet of element tags which are readable by the computer from the memory medium and which define an event, a condition and an action, comprising:
    an event element tag indicating a type of event to be captured by the computer;
    a condition element tag indicating a state of the first media object element; and
    an action element tag indicating the second media object element, an attribute of the second media object element, and a value of the attribute,
    wherein the condition element tag and the action element tags are children of said event element tag; and
    wherein the event, condition and action element tags represent a function to change a value of the attribute of the second media object element indicated by the action element tag to the value indicated by the action element tag if the event of the type indicated by the event element tag is detected and if the first media object element possesses the state indicated by the condition element tag.

13. A set of element tags according to claim 12, wherein the event element tag indicates a user event.

14. A set of element tags according to claim 12, wherein the event element tag indicates a system event.

15. A set of element tags according to claim 12, wherein, in a case that the event is NULL, the element tags represent a function to change the value of the attribute of the second media object if the first media object possesses the state indicated by the condition element tag.

16. A set of element tags according to claim 12, further comprising a second condition element tag indicating a second state of a third media object,
wherein the element tags represent a function to change the value of the attribute of the second media object if the event is detected, if the first media object possesses the state indicated by the condition element tag, and if the third media object possesses the second state indicated by the second condition element tag.

17. In an extensible markup language document stored on a computer-readable memory medium, wherein said document comprises plural elements including a media object element used in developing and executing a multimedia presentation by a computer, a pair of element tags which are readable by the computer from the memory medium and which define an event and an interpolation, comprising:
an event element tag indicating a type of event to be captured by the computer; and
an interpolation element tag indicating the media object element, an attribute of the media object element, a first time, a second time, and an end value of the attribute,
wherein said interpolation element tag is a child to said event element tag; and
wherein the event and interpolation element tags represent a function to gradually change a value of the attribute indicated by the interpolation element tag to the end value indicated by the interpolation element tag over a period beginning at the first time and ending at the second time indicated by the interpolation element tag if the event of the type indicated by the event element tag is detected.

18. A set of element tags according to claim 17, wherein the event element tag indicates a user event.

19. A set of element tags according to claim 17, wherein the event element tag indicates a system event.

20. In an extensible markup language document stored on a computer-readable memory medium, wherein said document comprises plural elements including first and second media object elements used in developing and executing a multimedia presentation by a computer, a triplet of element tags which are readable by the computer from the memory medium and which define an event, a condition and an interpolation, comprising:
an event element tag indicating a type of event to be captured by the computer;
a condition element tag indicating a state of the first media object element; and
an interpolation element tag indicating the second media object element, an attribute of the indicated second media object element, a first time, a second time, and an end value of the attribute,
wherein the condition element tag and the interpolation element tag are children of said event element tag; and
wherein the event, condition and interpolation element tags represent a function to gradually change a value of the attribute indicated by the interpolation element tag to the end value indicated by the interpolation element tag over a period beginning at the first time and ending at the second time indicated by the interpolation element tag if the event of the type indicated by the event element tag is detected and if the first media object element possesses the state indicated by the condition element tag.

21. A set of element tags according to claim 20, wherein the event element tag indicates a user event.

22. A set of element tags according to claim 20, wherein the event element tag indicates a system event.

23. A set of element tags according to claim 20, wherein, in a case that the event is NULL, the element tags represent a function to gradually change a value of the attribute indicated by the interpolation element tag to the end value indicated by the interpolation element tag over a period beginning at the first time and ending at the second time indicated by the interpolation element tag if the first media object possesses the state indicated by the condition element tag.

24. A set of element tags according to claim 20, further comprising a second condition element tag indicating a second state of a third media object,
wherein the element tags represent a function to change a value of the attribute of the second media object if the event of the type indicated by the event element tag is detected, if the first media object possesses the indicated state, and if the third media object possesses the second state indicated by the second condition element tag.

25. In an extensible markup language document stored on a computer-readable memory medium, wherein said document comprises plural elements used in developing and executing a multimedia presentation by a computer, a switch element tag which is readable by the computer from the memory medium and which defines a switch, comprising:
an element ID referred to by elements elsewhere in the document;
plural child elements nested in said switch element, wherein each child element comprises:
a test-element attribute for indicating a particular media object element identified elsewhere in said document;
a test-attribute attribute for indicating an attribute of the particular media object element; and
a test-value attribute for indicating a test value to compare with a value of the indicated attribute,
wherein the switch element tag causes said computer to compare a value associated with the attribute indicated by the test-attribute attribute of the media object element indicated by the test-element attribute with the test value indicated by the test-value attribute, and to process the first child element for which the comparison is TRUE.

26. A computer-readable memory medium storing computer executable process steps to process an extensible-markup language document according to any of claims 1 to 25, so as to cause a computer to render a multimedia presentation.

* * * * *